United States Patent [19]

Tsukiji et al.

[11] Patent Number: 5,051,579
[45] Date of Patent: Sep. 24, 1991

[54] OPTICAL SCALE ENCODER WITH LIGHT INTENSITY ALARM

[75] Inventors: Masaaki Tsukiji, Tokyo; Tetsuharu Nishimura, Kawasaki; Koh Ishizuka, Urawa; Satoshi Ishii, Tokyo, all of Japan

[73] Assignee: Canon Kabushiki Kaisha, Tokyo, Japan

[21] Appl. No.: 532,108

[22] Filed: Jun. 1, 1990

Related U.S. Application Data

[63] Continuation of Ser. No. 176,273, Mar. 31, 1988, abandoned.

[30] Foreign Application Priority Data

Mar. 25, 1988 [JP] Japan .................................. 63-71112
Apr. 3, 1987 [JP] Japan .................................. 62-82248

[51] Int. Cl.$^5$ ............................................. G01D 5/34
[52] U.S. Cl. ........................... 250/231.16; 250/237 G
[58] Field of Search ..................... 250/231 SE, 237 G, 231.13–231.18, 250/205; 340/641

[56] References Cited

U.S. PATENT DOCUMENTS

| | | | |
|---|---|---|---|
| 3,756,723 | 9/1973 | Hock | 250/237 G |
| 3,944,813 | 3/1976 | Fowler | 250/231.18 |
| 4,536,762 | 8/1985 | Moates | 250/231.15 |
| 4,587,485 | 5/1986 | Papiernik | 250/231.16 |
| 4,629,886 | 12/1986 | Akiyama et al. | 250/237 G |
| 4,676,645 | 6/1987 | Taniguchi et al. | 250/237 G |

Primary Examiner—David C. Nelms
Assistant Examiner—Khaled Shami
Attorney, Agent, or Firm—Fitzpatrick, Cella, Harper & Scinto

[57] ABSTRACT

An encoder for measuring movement of an optical scale by photoelectrically converting light from the optical scale obtained by applying light from a light source to the optical scale, by means of light receiving element, includes detector for detecting a variation in intensity of the light received by the light receiving element and a comparator for comparing a signal from the detector with a predetermined reference signal. Consequently, a predetermined alarm signal is generated on the basis of the result of comparison obtained from the comparator. A measuring system for detecting a moving condition of an object, includes an optical scale connected to the object; a light source for applying light to the optical scale; a first detector for receiving light from the optical scale and for detecting the moving condition of the object; a second detector for detecting a variation in intensity of the light received by the first detector; and a signal forming device for forming a predetermined alarm signal on the basis of an output signal from the second detector.

9 Claims, 3 Drawing Sheets

OPTICAL SCALE ENCODER WITH LIGHT INTENSITY ALARM

This application is a continuation of application Ser. No. 07/176,273, filed Mar. 31, 1988, now abandoned.

BACKGROUND OF THE INVENTION

1. Field of the Invention

The present invention relates to an encoder for measuring movement of an object, and more particularly, it relates to a photoelectric encoder for measuring movement of a diffraction grid, wherein a luminous flux having an interference characteristic is applied to the diffraction grid by which a plurality of diffracted light beams are generated, an interference fringe is formed by effecting interference of the diffracted light beams and the movement of the diffraction grid is measured by photoelectrically converting the interference fringe to an electric signal.

2. Related Background Art

Recently, in the field of precision machines such as numerically controlled machine tools, semiconductor printers and the like, there has been a need to provide a precision measuring device which can measure the movement of a moving object in the order of 1 $\mu$m or less (submicron).

For example, a conventional rotary encoder as shown in FIG. 1 includes a disc 35 connected to a rotatable shaft 30 of a motor and the like, a so-called main scale 31 having a plurality of light permeable areas and light shield areas arranged alternately and equidistantly on a peripheral portion of the disc, a so-called fixed index scale 32 positioned to face the main scale and having a plurality of light permeable areas and light shield areas arranged alternately and equidistantly in correspondence to those of the main scale, and photoelectric means, 33, 34 comprising light emitters 33 and light receivers 34 arranged in registration with each other to interpose the scales 31, 32 therebetween. In this rotary encoder, when the main scale on the disk is rotated, a pulse signal is obtained in dependence on widths of the light permeable area and light shield area. Thus, by analyzing frequency of the pulse signal, the fluctuation or variation of the rotational speed of the rotatable shaft 30 can be detected; or, by counting the number of the pulses of this signal, the amount of rotation of the rotatable shaft 30 can be measured.

However, when such a photoelectric rotary encoder is used with a machine tool, if an electric failure causing the extinction of a light source occurs, the output signal from the encoder disappears.

In this case, if the control system of the machine tool cannot detect the abnormality of the encoder immediately, there will arise an overdrive of the motors in the machine tool to cause damage of the machine tool.

Further, in other conventional encoders wherein the movement of a diffraction grid is measured by photoelectrically converting an interference fringe formed by overlapping diffraction light beams obtained by the diffraction grid, as disclosed in U.S.P. No. 3,726,595, 3,738,753 and 4,629,886 and the like, the intensity of light of the interference fringe does not often reach a predetermined value due to smudging and/or misalignment of optical parts for defining a plurality of light paths of the diffracted light beams to create the interference fringe, or due to damage and/or smudging of the diffraction grid itself, as well as due to the above-mentioned electric failure of the light source and the like.

Accordingly, in these conventional encoders, the cause of the damage of the machine tool with which the encoder is associated and/or the electric failure of the encoder is further increased. Thus, there is a need to overcome these disadvantages.

SUMMARY OF THE INVENTION

An object of the present invention is to provide an encoder which can detect an abnormality in the encoder itself.

In order to achieve the above object, according to the present invention, there is provided an encoder for measuring movement of an optical scale by photoelectrically converting light from the optical scale obtained by applying light from a light source to the optical scale, by means of light receiving means, comprising detecting means for detecting a variation in the intensity of light received by the light receiving means, and comparison means for comparing a signal from the detecting means with a predetermined reference signal, whereby a predetermined alarm signal is generated on the basis of the result of comparison obtained from the comparison means.

According to an aspect of the present invention, there is provided an encoder for measuring movement of an optical scale, wherein the optical scale has a diffraction grid arranged along a moving direction of the optical scale, and wherein the movement of the optical scale is measured by photoelectrically converting an interference fringe formed by diffracted light obtained by applying interferable light to the diffraction grid of the optical scale, comprising detecting means for detecting a variation in the intensity of the diffracted light, and comparison means for comparing a signal from the detecting means with a predetermined reference signal, whereby a predetermined alarm signal is generated on the basis of the result of comparison obtained from the comparison means.

The encoder according to the present invention can be applied to various apparatuses and systems having a given movable part, for detecting a moving condition such as an amount of movement, moving speed, an instant position and the like of the moving part. The output from the encoder can be used to control such apparatuses and systems. An alarm signal from the encoder according to the present invention is sent to warning means such as lamp (or LED) or buzzer provided in the apparatus and the like with which the encoder is associated. Further, the alarm signal can be inputted to a CPU for controlling the whole apparatus or system with which the encoder is associated, to stop the operation of the apparatus and the like in response to the alarm signal.

Further, the comparison means may be provided in the apparatus or system with which the encoder is associated, or instead it can be provided in the encoder itself. In this case, output of the alarm signal can be controlled by such comparison means provided in the apparatus and the like.

Other characteristics and constructions of the present invention will be apparent from the following description with reference to embodiments illustrated in the drawings.

DESCRIPTION OF THE PREFERRED EMBODIMENTS

The present invention will now be explained in detail with reference to the drawings.

Figure 1:
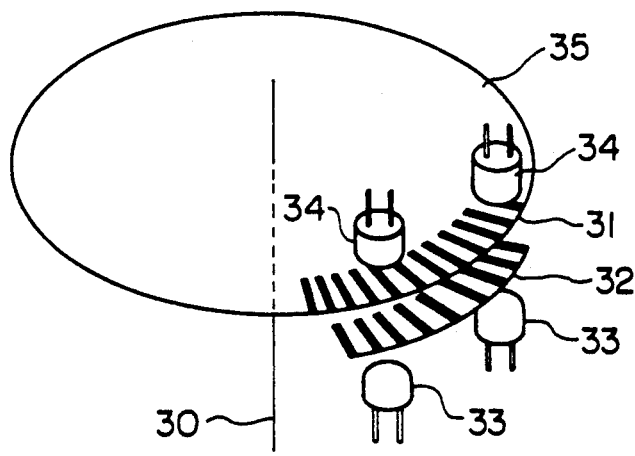
FIG. 1 is a schematic perspective view of a conventional encoder.
Figure 2:
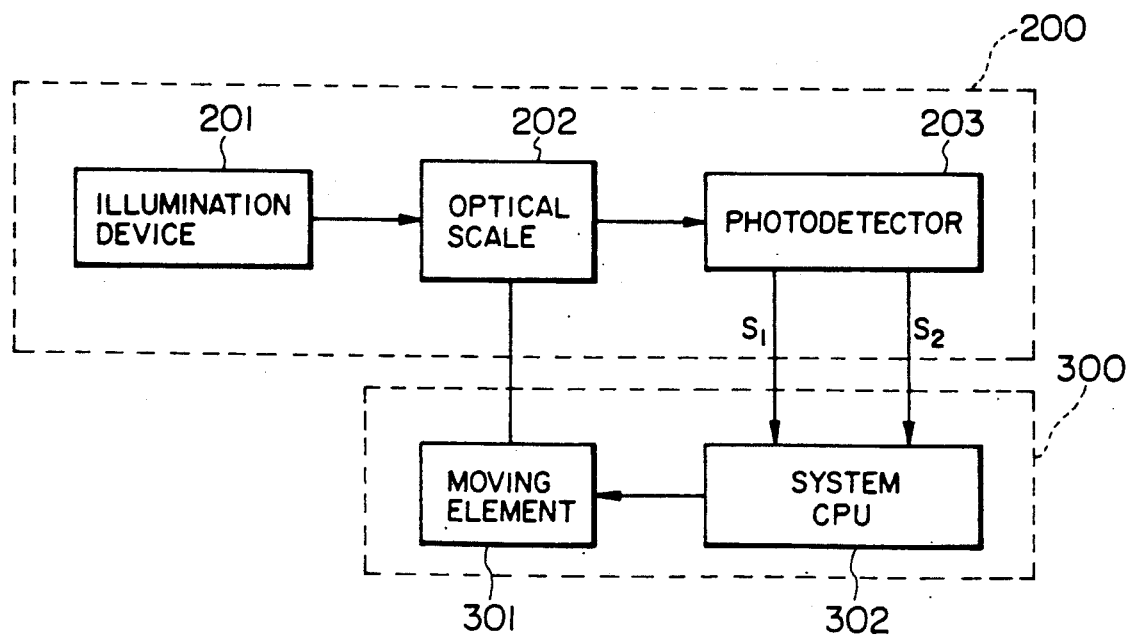
FIG. 2 is a block diagram showing a principle of the present invention.

FIG. 2 is a block diagram showing a principle of the present invention.

In FIG. 2, the reference numeral 200 designates an encoder which comprises an optical scale 202, an illumination device 201 for illuminating a light on the optical scale 202, and a photodetector 203 for detecting the light reflected by the optical scale 202 and/or the light passed through the optical scale 202. The optical scale 202 may comprise a plurality of reflection areas and light permeable areas (light shield areas) arranged alternately in a moving direction of the optical scale 202, a plurality of light permeable areas and light shield areas arranged alternately in a moving direction of the optical scale 202, or a diffraction grating of the amplitude-type or phase-type. The photodetector 203 has a light receiving element for receiving the light from the optical scale 202 and for effecting photoelectric conversion of the received light. The light receiving element outputs a signal in response to the relative movement of the optical scale 202 with respect to the light receiving element, and a signal for generating an alarm signal. This alarm signal is obtained by comparing the output signal from the light receiving element with a reference signal by means of a predetermined comparison means which receives the output signal from the light receiving means. The reference numeral 300 designates a system such as a machine tool, measuring instrument, recording apparatus and the like on which the encoder 200 is attached. The system 300 includes a moving element 301, and a system CPU 302 for effecting the control of the whole system. The moving element 301 may comprise, for example, a movable stage, motor shaft, movable printing head or the like. The optical scale 202 of the encoder 200, or a unit including the illumination device 201 and the photodetector 203 of the encoder is connected to the moving element 301 so that the moving condition of the moving element 301 can be monitored by the encoder 200. The output signals from the photodetector 203 are sent to the system CPU 302, which controls the whole system 300 on the basis of these output signals.

The encoder according to the present invention can output a signal S1 for representing the moving condition of the moving element 301 and an alarm signal S2 for representing an abnormality of the encoder itself, these signals being sent to the system CPU 302.

When the alarm signal S2 is inputted to the system CPU 302, the system CPU 302 stops the movement of the moving element 301 on the basis of the alarm signal S2. Or, on the basis of the alarm signal S2, the system CPU 302 energizes luminous means and/or buzzer means provided in the system 300, thereby warning the abnormality of the encoder.

The above-mentioned comparison means for generating the alarm signal S2 can be incorporated into the system 300, or instead it can be incorporated into the encoder 200. In this case, the encoder 200 is provided with an appropriate output terminal (not shown) for sending the signal to be compared (from the encoder 200) to the comparison means incorporated in the system 300.

By generating the alarm signal S2 as mentioned above, overdrive or overrunning of the moving element 301 can be prevented, thereby controlling the system 300 stably.

Next, the detailed construction of the encoder according to the present invention will be explained.

Figure 3:
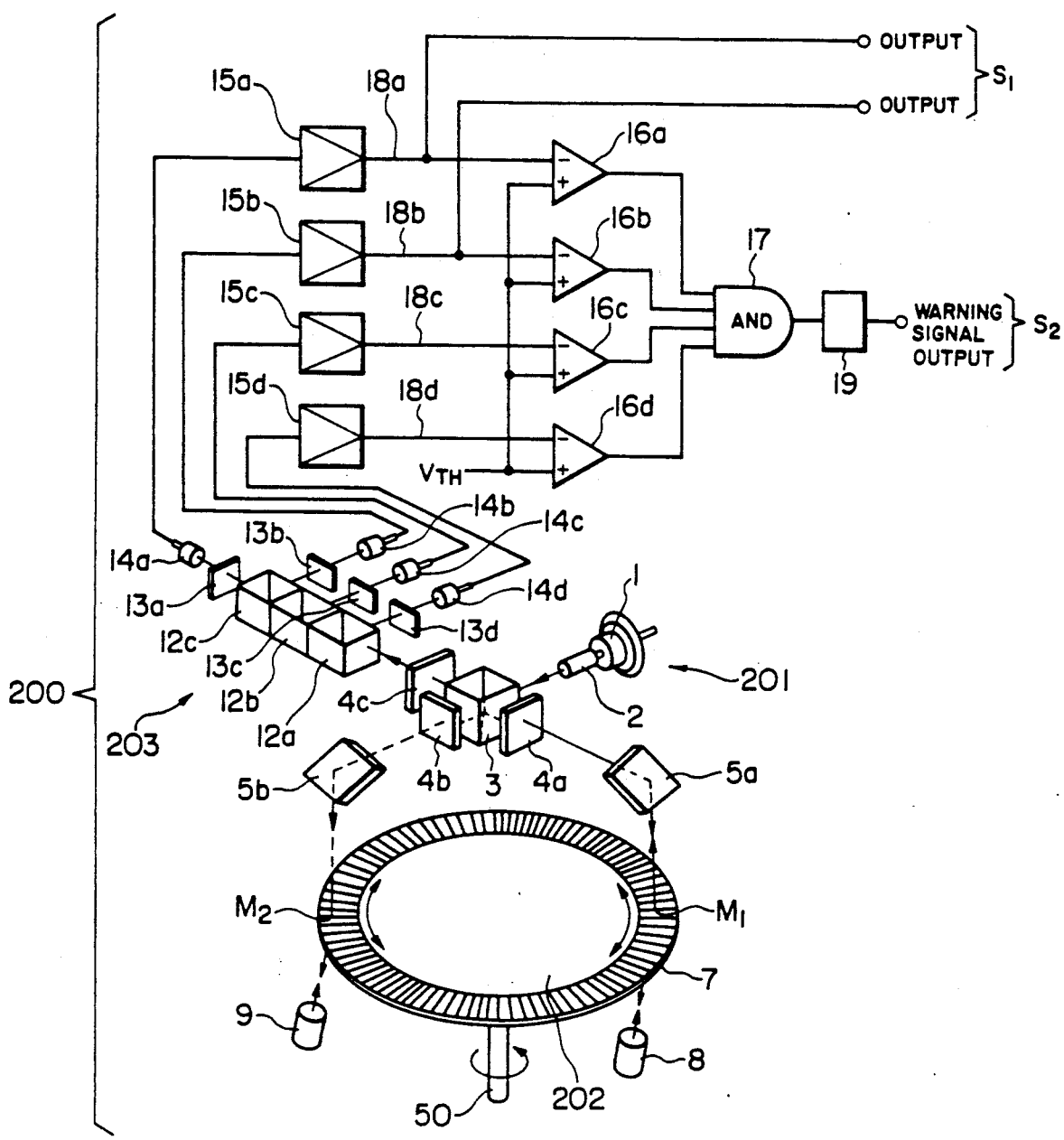
FIG. 3 shows a construction of an encoder according to a preferred embodiment of the present invention.

FIG. 3 shows the construction of the encoder according to a preferred embodiment of the present invention.

In the illustrated embodiment, a light beam emitted from a laser unit 1 is changed to a parallel luminous flux by means of a collimator lens 2, and then is sent to a polarizing beam splitter 3, where the luminous flux is divided into an S-polarized light beam (reflected by the beam splitter) and a P-polarized light beam (passed through the beam splitter) which are perpendicular to each other with respect to these polarization directions and have substantially the same amount of light. The S-polarized light beam reflected by the beam splitter 3 is sent to a ¼ wavelength plate 4a, where the light beam is changed to a circular polarized light beam which is then sent to a reflection mirror 5a. The light beam reflected by the mirror 5a is in turn applied to a radial diffraction grating 7 at a position M1, which radial diffraction grating 7 is arranged on an annular peripheral portion of a disc-like optical scale 202 connected to a rotating object to be measured (not shown). The light beam illuminated on and diffracted by the diffraction grating 7 passes through the grid 7 to reach a reflection means 8. Among the diffracted light reaching the reflection means 8, the light having a particular degree is reflected by the reflection means 8 to direct it to the same light path as that of the diffracted light beam so that the reflected light beam can re-enter the diffraction grating 7 of the optical scale 202 at the same position M1. The reflected light beam is diffracted again by the diffraction grating 7 to produce a diffracted light beam having the particular degree. This diffracted light beam is then sent, through the ¼ wavelength plate so that the diffracted light beam is changed to a P-polarized light beam having a polarization direction different, by 90 degrees, from that of the incident S-polarized light beam from the beam splitter 3. This P-polarized diffracted light beam is then sent to the beam splitter 3.

In the illustrated embodiment, the light path (optical path) of the light beam from the beam splitter 3 to the reflection means 8 is identical with the light path of the reflected light beam from the reflection means 8 to the beam splitter 3.

On the other hand, the aforementioned P-polarized light beam divided by and passed through the beam splitter 3 is sent to a ¼ wavelength plate 4b, where the P-polarized light beam is changed to a circular polarized light beam which is then sent to a reflection mirror 5b. The light beam reflected by the mirror 5b is in turn applied to the radial diffraction grating 7 of the optical scale 202 at a position M2 which is symmetrical with respect to the rotation axis 50 so as to be opposed to the position M1. The light beam illuminated on and diffracted by the diffraction grating 7 passes through the grid 7 to reach a reflection means 9 similar to the aforementioned reflection means 8. Similarly, light beam reflected by the reflection means 9 and having a particular degree is returned (through the same light path as that of the light beam from the beam splitter 3 to the reflection means 9), through the position M2 of the grid 7 and the reflection mirror 5b, to the ¼ wavelength plate 4b, where the diffracted light beam is changed to an S-polarized light beam having a polarization direction different, by 90 degrees, from the incident P-polarized light beam from the beam splitter 3. This S-polarized diffracted light beam is then sent to the beam splitter 3.

Also, in this case, the light path of the light beam from the beam splitter 3 to the reflection means 9 is identical with the light path of the reflected light beam from the reflection means 9 to the beam splitter 3. Therefore, the P-polarized light beam from the ¼ wavelength plate 4a and the S-polarized light beam from the ¼ wavelength plate 4b are combined again. The combined light beam is sent to a ¼ wavelength plate 4c, where the combined light beam is changed to a circular polarized light beam which is then sent to a light dividing means comprising three light dividers 12a, 12b and 12c. The light beam sent to the light dividing means is divided into four light beams. The divided light beams are sent to corresponding light receiving means 14a, 14b, 14c and 14d through a pair of polarization plates 13a, 13b and a pair of polarization plates 13c, 13d. The paired polarization plates 13a, 13b and 13c, 13d are arranged so that the polarization directions of the paired plates 13a, 13b and 13c, 13d deviate, by 45 degrees, respectively. Thus, the light beams to be sent to the corresponding receiving means 14a, 14b, 14c and 14d become interference light beams through the corresponding polarization plates 13a, 13b, 13c and 13d. The interference light beams are phase deviated from each other by 90 degrees. Now, the intensity of an interference fringe formed on a light receiving surface of each of the light receiving means 14a, 14b, 14c and 14d by two light beams can be detected. Here, the term "interferenced light beam" means a light beam having the characteristic that the brightness of an interference fringe formed by the light beam is varied in response to movement of the optical scale 202.

In the illustrated embodiment, the function of the rotary encoder, that is to say, the angular velocity and/or angular displacement of the optical scale 202 (and, accordingly, the rotating object) is obtained by utilizing the output signals S1 from two of the four light receiving means, for example, the light receiving means 14a and 14b.

For example, in the illustrated embodiment, when the rotating object to be measured is rotated by an amount corresponding to one pitch of the diffraction grating 7, the phase of the diffracted light beam having m degree is varied by 2 m$\pi$. Similarly, the phase of the diffracted light beam re-diffracted by the diffraction grating 7 and having n degree is varied by 2 n$\pi$. Thus, (2m−2n) sine wave forms can be obtained from each of the light receiving means 14a and 14b per one pitch of the diffraction grating. In this case, in the illustrated embodiment, the amount of rotation of the moving object is measured by detecting such wave forms and by counting the pulses of the wave forms.

Further, in the illustrated embodiment, the rotational direction of the moving object can be determined by providing the difference between the phases of two interferable light beams due to the fact that the polarization direction of the polarization plate 13a is deviated from that of the polarization plate 13b by 45 degrees.

Figure 4:
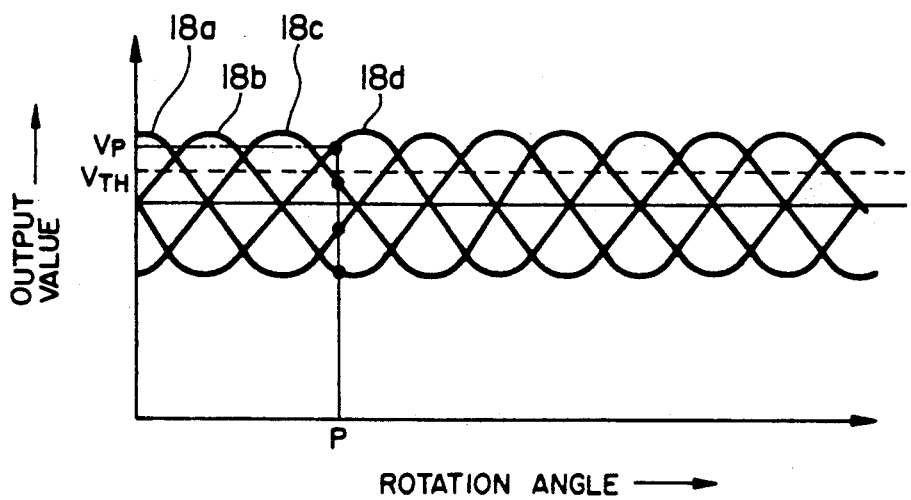
FIG. 4 shows wave forms of output signals emitted from light receiving means of the encoder of FIG. 3.

In the illustrated embodiment, four sine wave form outputs which have phases deviated from each other by 90 degrees are obtained from the corresponding four light receiving means 14a–14d; thus, by amplifying these four sine wave form outputs (from the four light receiving means 14a–14d) by means of corresponding amplifiers 15a–15d, four output signals 18a–18d as shown in FIG. 4 can be obtained.

FIG. 4 shows wave forms of the output signals 18a–18d in each phase obtained from the four light receiving means 14a–14d when the optical scale 202 is rotated. As shown, these outputs comprise sine wave forms having phases deviated from each other by 90 degrees.

As apparent from FIG. 4, in any rotation angle of the optical scale, for example, in a rotation angle position corresponding to a point P, at least one of the output signals 18a–18d in each phase has an output value Vp higher than a given threshold value Vth. Consequently, if all of the output values of the output signals 18a–18d are lower than the threshold value Vth at some time, since this means that the intensity of the interferable light beams (and, accordingly, the intensity of the diffracted light beams) is decreased, it can be determined that some abnormality is occurring in the light source, the optical system and/or a mechanical member (such as the optical scale 202) of the encoder 200.

To this end, in the present invention, as shown in FIG. 3, output signals from the amplifiers 15a–15d are inputted to comparators 16a–16d, respectively, where each of said output signals is compared with the threshold value Vth. If all of the output signals 18a–18d are lower than the threshold value Vth, a "HIGH" output signal is emitted from an AND circuit 17.

Therefore, when the "HIGH" output signal is outputted from the AND circuit 17, since this means that all of the output signals 18a–18d are lower than the threshold value Vth, it can be determined that the intensity of the interferable light beams decreases below the predetermined value.

In this case, in the illustrated embodiment, it is constructed such that the operator can be warned of an abnormality of the encoder by generating the alarm signal by means of warning means 19 on the basis of the output signal from the AND circuit 17.

Instead of providing four output signals having the phases deviated from each other by 90 degrees as in the embodiment shown in FIG. 3, three output signals having phases deviated from each other by 120 degrees may be obtained by utilizing three light receiving means, or five or more output signals may be obtained; also, in these cases, it should be noted that all of these output signals are compared with the threshold value.

Although the present invention has been explained with respect to the rotary encoder in the illustrated embodiment mentioned above, it should be understood that the present invention can be applied to a linear encoder.

According to the above-mentioned embodiment, an abnormality of the encoder can be easily detected by measuring the intensity of the plurality of interferable light beams having different phases, with the result that an accident or trouble in the whole system in which the encoder is incorporated can be prevented from occurring, by generating an alarm signal immediately after the abnormality is detected.

Further, the operator can be warned of a deficiency such as electricity failure causing failure of the light source, damage, smudging and/or misalignment of the optical system and the like by generating the alarm signal, thus improving the operation of the whole system.

Figure 5:
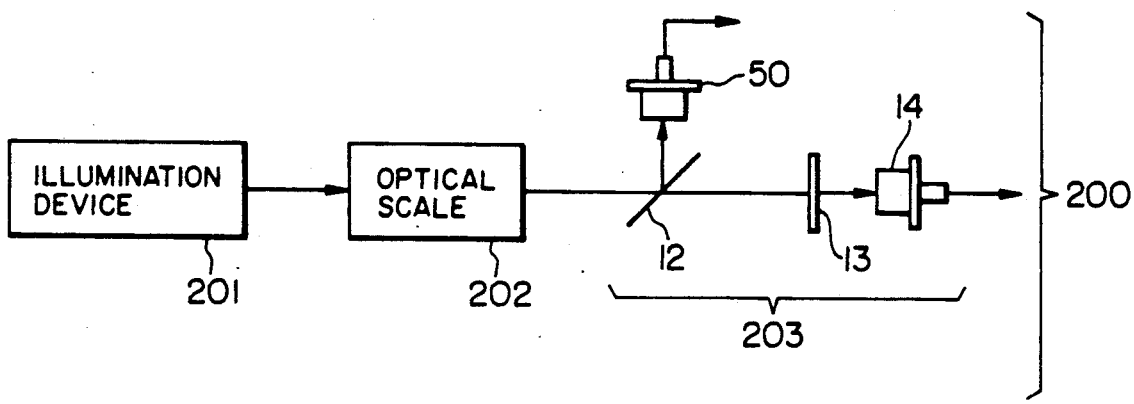
FIG. 5 is a schematic block diagram showing another embodiment of the present invention.

FIG. 5 is a schematic block diagram showing another embodiment of an encoder according to the present invention. A concrete construction of the encoder in this embodiment is substantially the same as that shown in FIG. 3.

In the previous embodiment shown in FIG. 3, in order to obtain the alarm signal, the two diffracted light beams from the diffraction grating 7 of the optical scale 202 are sent to the polarization plates 13a–14d, and the interferable light beams are received by the light receiving means 14a–14d, thus detecting the variation in the intensity of the diffracted light.

However, in this another embodiment, before the interferable light beam is formed or generated by the pair of diffracted light beams from the diffraction grating 7 of the optical scale 202, a part of the diffracted light beams is reflected by a half mirror 12 (FIG. 5) to reach a light receiving element 50. The light receiving element 50 outputs a signal in response to the intensity of the received diffracted light beam. On the other hand, the remaining part of the paired diffracted light beams passes through the half mirror 12 to reach a polarization plate 13, where the light beams are changed to interferable light beams which create an interference fringe on a light receiving surface of the light receiving element 13. And, as stated above, an amount of rotation of the optical scale 202 (and, accordingly, the rotating object to be measured) can be detected on the basis of an output signal from the light receiving element 14.

Figure 6A:
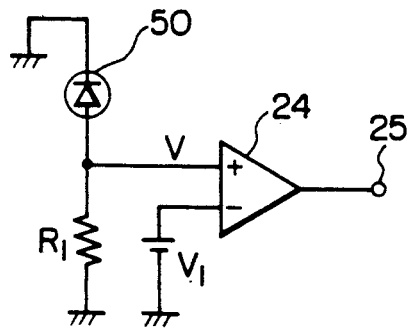
FIGS. 6A and 6B are electric circuits showing examples of comparison means of the encoder.
Figure 6B:
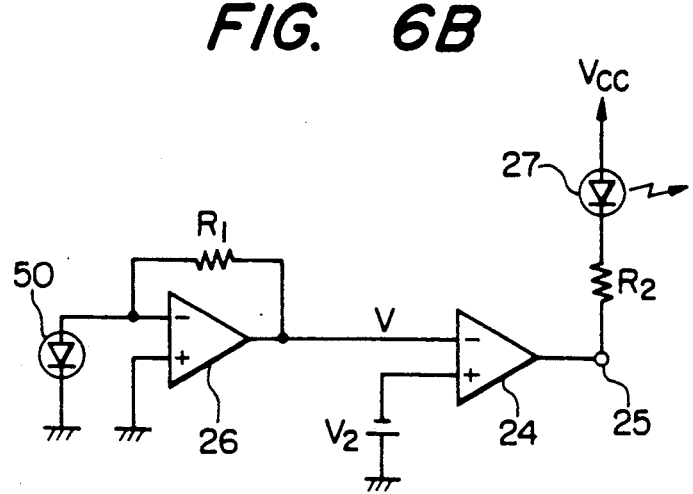

FIG. 6A and FIG. 6B show examples of a comparison means for comparing the output signal from the light receiving element 50 with a predetermined reference signal, thereby outputting an alarm signal.

In FIG. 6A, in response to the intensity of the diffracted light beam received by the light receiving element 50, a voltage V is generated at an upper end of a resistor R; this voltage V is compared with a reference voltage V1 (corresponding to a predetermined intensity of the diffracted light beam) by means of a comparator 24; the comparator 24 outputs a signal representing the result of comparison (between V and V1) to an output terminal 25. A value of the reference voltage V1 is so selected that when the encoder 200 is operating in a normal condition the value of the reference voltage is always lower than that of the voltage V. Therefore, in the normal condition, since V>V1, the output terminal 25 emits a "HIGH" output signal. On the other hand, if some abnormality is generated in the encoder so that the intensity of the diffracted light beam is decreased to lower the voltage V up to or less than the reference voltage V1 (i.e., V≦V1), the output terminal 25 emits "LOW" output signal. Thus, the "LOW" output signal from the output terminal 25 can be as the alarm signal. Alternatively, the alarm signal may be generated by an appropriate warning means (not shown) on the basis of the "LOW" output signal from the output terminal 25.

In FIG. 6B, in response to the intensity of the diffracted light beam received by the light receiving element 50, an electric current is generated, on the basis of which a voltage V is generated on an output terminal of an operation amplifier 26; this voltage V is compared with a reference voltage V2 by means of a comparator 24; the comparator 24 outputs a signal representing the result of comparison to an output terminal 25. Similarly, as in the case of FIG. 6A, a value of the reference voltage V2 is so selected that when the encoder 200 is operating in a normal condition the value of the reference voltage is always lower than that of the voltage V. Therefore, in the normal condition, since V>V2, the output terminal 25 emits a "HIGH" output signal. On the other hand, if same abnormality is generated in the encoder 200 so that the intensity of the diffracted light beam is decreased to lower the voltage V up to or less than the reference voltage V2 (i.e., V≦V2), the output terminal 24 emits "LOW" output signal.

In FIG. 6B, this "LOW" output signal acts as the alarm signal, which energizes or lightens a LED 27 connected to the output terminal 25 through a resistor R2.

The alarm signal obtained by the circuit shown in FIG. 6A or FIG. 6B may be directly inputted to the system 300 (such as the machine tool and the like) to which the encoder 200 is incorporated, as mentioned above.

According to the present invention, since an abnormality of the encoder can be detected immediately, it is possible to prevent the damage of the system in which the encoder is incorporated.

What is claimed is:

1. A measuring system for detecting the moving condition of an object, comprising:
   an optical scale connected to said object;
   illumination means for applying light to said optical scale;
   light receiving means for receiving light from said optical scale and for producing output signals with different phases in accordance with the movement of the object;
   alarm signal forming means for detecting a variation in intensity of the light received by said light receiving means and for generating a predetermined alarm signal, wherein said alarm signal forming means includes comparison means for comparing each of the levels of the output signals from said light receiving means with a predetermined reference level and generating means for generating the predetermined alarm signal when at least one of levels of at least one of the output signals is less than the predetermined reference levels;
   a diffraction grating arranged on said optical scale along a moving direction of the object, wherein said illumination means applies light to said diffraction grating to generate first and second diffracted light, and wherein said light receiving means photoelectrically converts an interference fringe formed by effecting interference between the first diffracted light and the second diffracted light generated by said diffraction grating into electrical signals.

2. A measuring system according to claim 1, wherein said optical scale comprises a rotary scale.

3. A measuring system for detecting the moving condition of an object, comprising:

illumination means for applying light to an optical scale connected to the object;

light receiving means, including at least three photodetectors, for receiving light reflected from said optical scale, and for producing output signals with different phases in accordance with the movement of the object; and alarm signal forming means for detecting a variation in intensity of the light received by said light receiving means, and for generating a predetermined alarm signal, said alarm signal forming means including (a) comparison means for comparing each of the levels of the output signals of said photodetectors with a predetermined reference level at the same time, and (b) generating means for generating the predetermined alarm signal when the levels of all of the output signals are less than the predetermined reference level.

4. A measuring system according to claim 3, wherein at least one of the output signals from said at least three photodetectors exceeds the predetermined reference level in a normal condition irrespective of the position of said optical scale.

5. A measuring system according to claim 3, wherein said optical scale comprises a rotary scale.

6. A measuring system for detecting the moving condition of an object, comprising:

an optical scale connected to the object and comprising a diffraction grating arranged on said optical scale along a moving direction of the object;

illumination means for applying light to said optical scale;

light receiving means, including at least three photodetectors, for receiving light reflected from said optical scale, and for producing output signals with different phases in accordance with the movement of the object; and alarm signal forming means for detecting a variation in intensity of the light received by said light receiving means, and for generating a predetermined alarm signal, said alarm signal forming means including (a) comparison means for comparing each of the levels of the output signals of said photodetectors with a predetermined reference level at the same time, and (b) generating means for generating the predetermined alarm signal when the levels of all of the output signals are less than the predetermined reference level.

7. A measuring system according to claim 6, wherein at least one of the output signals from said at least three photodetectors exceeds the predetermined reference level in a normal condition irrespective of the position of said optical scale.

8. A measuring system according to claim 6, wherein said illumination means applies light to said diffraction grating to generate first and second diffracted light, and wherein said light receiving means photoelectrically converts an interference fringe, formed by affecting interference between the first diffracted light and the second diffracted light generated by said diffraction grating, into electrical signals.

9. A measuring system according to claim 6, wherein said optical scale comprises a rotary scale, and wherein said diffraction grating is formed along a rotational direction of said rotary scale.

* * * * *

UNITED STATES PATENT AND TRADEMARK OFFICE
CERTIFICATE OF CORRECTION

PATENT NO. : 5,051,579
DATED : September 24, 1991
INVENTOR(S) : Masaaki Tsukiji, et al.

It is certified that error appears in the above-identified patent and that said Letters Patent is hereby corrected as shown below:

COLUMN 7:

Line 19, "plates 13a-14d," should read --plates 13a-13d,--.

COLUMN 8:

Line 15, "same" should read --some--.

Line 54, " levels; " should read --level; and--.

COLUMN 10:

Line 26, "affecting" should read --effecting--.

Signed and Sealed this

Twenty-third Day of March, 1993

Attest:

STEPHEN G. KUNIN

Attesting Officer

Acting Commissioner of Patents and Trademarks